United States Patent
Hunt et al.

(10) Patent No.: US 6,850,359 B2
(45) Date of Patent: Feb. 1, 2005

(54) CONTINUOUS WAVE INFRARED OPTICAL PARAMETRIC AMPLIFIER

(75) Inventors: Jeffrey H. Hunt, Chatsworth, CA (US); Phillip Tsefung Nee, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 10/161,413

(22) Filed: Jun. 3, 2002

(65) Prior Publication Data

US 2003/0223105 A1 Dec. 4, 2003

(51) Int. Cl.[7] ................................................. H01S 3/00
(52) U.S. Cl. ...................................... 359/333; 359/342
(58) Field of Search ................................ 359/330, 333, 359/342, 346, 349

(56) References Cited

U.S. PATENT DOCUMENTS

| | | | | |
|---|---|---|---|---|
| 3,200,342 A | * | 8/1965 | Kibler | 330/4.5 |
| 3,309,526 A | * | 3/1967 | Giordmaine | 359/330 |
| 3,875,422 A | * | 4/1975 | Stolen | 359/330 |
| 5,477,378 A | * | 12/1995 | Johnson | 359/326 |

OTHER PUBLICATIONS

Electric field poling of flux grown KTiOPO4, H Karlsson, Oct. 14, 1997, 3 pages.
Microlaser–pumped periodically poled lithium niobate optical parametric generator–optical parametric amplifier, K. W. Aniolek, Apr. 15, 2000/vol. 25, No. 8/ Optics Letters.
Monday Morning/Cleo 2000, May 8, p. 13.

* cited by examiner

*Primary Examiner*—Mark Hellner
(74) *Attorney, Agent, or Firm*—Harness Dickey & Pierce P.L.C.

(57) ABSTRACT

A continuous wave, infrared optical parametric amplifier system incorporating an extremely high gain, non-linear optical element. In one preferred form, the non-linear optical element comprises a periodically poled lithium niobate (PPLN) crystal. The amplifier system uses a beam combiner to combine a non-linear optical input signal with a continuous wave pump beam. The signals are optically co-aligned by the beam combiner and then input to the high gain, optical element wherein optical energy is transferred to the input signal. The resulting amplified, non-linear optical signal is then input into a beam separator which separates the input signal component from the pump beam component. The amplified input signal can then be readily detected by a conventional optical detector. The amplifier system eliminates the loss of information from the input signal which can occur with conventional pulsed laser amplifiers.

10 Claims, 1 Drawing Sheet

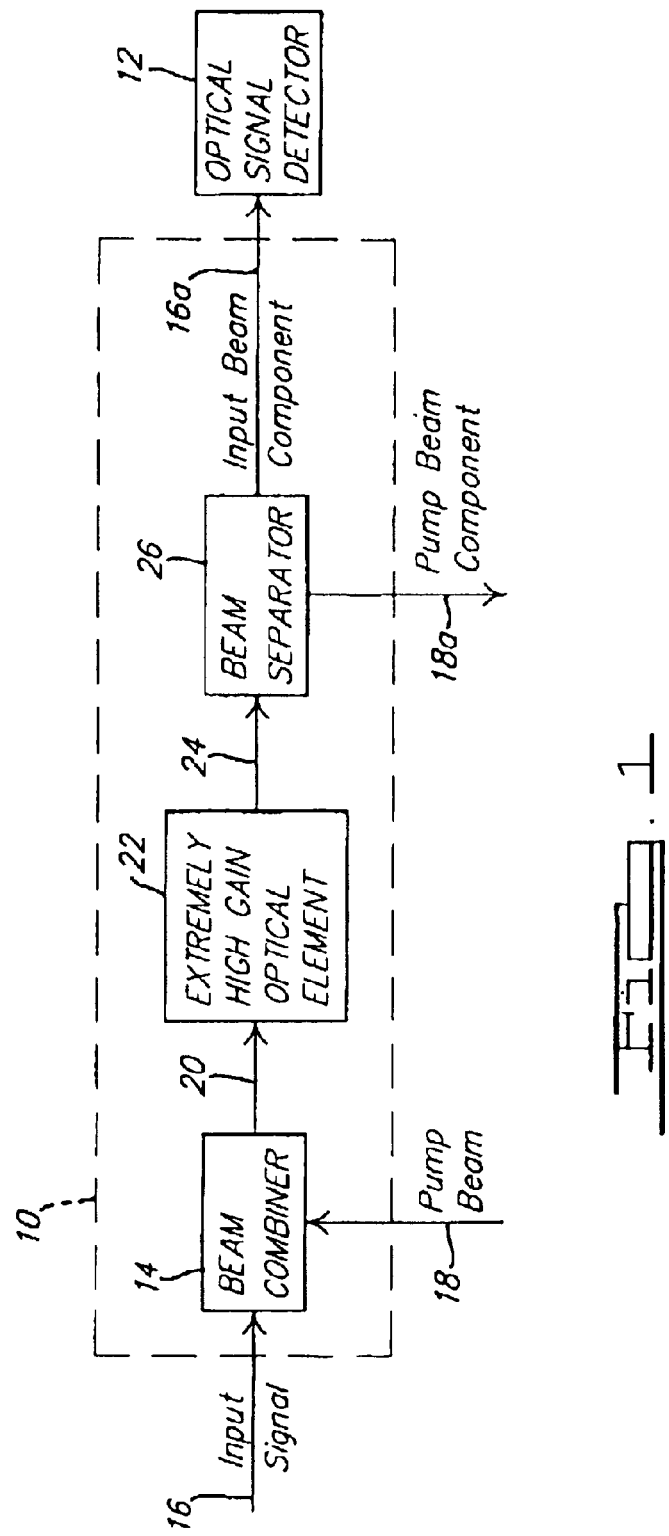

CONTINUOUS WAVE INFRARED OPTICAL PARAMETRIC AMPLIFIER

FIELD OF THE INVENTION

This invention relates to optical amplifiers, and more particularly to a continuous wave, infrared optical parametric amplifier incorporating an extremely high gain, non-linear optical crystal.

BACKGROUND OF THE INVENTION

The detection of optical radiation at infrared wavelengths has traditionally been difficult, even with state of the art optical detectors. Accordingly, it has typically been necessary to incorporate some form of amplifier system for amplifying the input infrared signal by a sufficiently high factor such that the signal can be more easily detected by existing optical detectors.

Present day amplifier systems used to amplify input infrared signals typically make use of a non-linear crystal. The non-linear crystal enables the physical process known generally as "parametric downconversion" to occur. In this process, a laser beam at a frequency $\omega_p$ propagates through the non-linear optical crystal. Via a non-linear optical interaction, the beam at frequency $\omega_p$ generates two other beams, the signal beam $\omega_s$ and the idler beam $\omega_i$. These two beams are generated subject to the conservation of energy constraint wherein $\omega_p$ equals $\omega_s$ plus $\omega_i$. Immediately, it will be appreciated that the beam $\omega_s$ and the beam $\omega_i$ will be of lower frequency (i.e., have a longer wavelength) than the first beam $\omega_p$, which may also be referred to as the "pump" beam.

It is also possible to generate the above-described amplification process by co-propagating a weak input signal at frequency $\omega_s$ along with a second beam at frequency $\omega_p$ as they enter the crystal together. Using the same non-linear optical process, optical energy at frequency $\omega_p$ will be transferred to the beam at $\omega_s$. The result will be that the strength of the signal $\omega_s$ increases significantly after it reaches the opposite end (i.e., output end) of the non-linear optical crystal. One can therefore treat the combination of the crystal and the pump beam $\omega_p$ as an amplifier for the optical signal $\omega_s$.

Even with the co-propagation of a weak input signal $\omega_s$ along with a pump beam $\omega_p$, in most instances the interaction that occurs within the non-linear crystal is not sufficiently strong to provide the needed degree of amplification. Traditionally, this limitation has been overcome by operating the non-linear optical amplifier in a pulsed mode. Although the average optical power remains low, the peak power can be made quite high, on the order of several megawatts per square centimeter, so that the conversion efficiency occurring within the non-linear crystal during the duration of the laser pulse is quite good. This works well for amplifying the signal $\omega_s$ if one has direct knowledge of its arrival time. For example, in active illumination cases, the signal pulse at $\omega_s$ that is coming from the sample can be gated in time with the illumination source. However, if one wishes to amplify a continuous wave (CW) signal at frequency $\omega_s$, the duty cycle associated with the pulsed laser format will lead to a loss of information over a large fraction of the $\omega_s$ signal.

Therefore, ideally speaking, the amplifier should also be pumped in a continuous wave mode, thus allowing amplification of the $\omega_s$ signals that arrive at random intervals. Since the continuous wave pump intensity, however, will be much lower than the pump intensity provided in the pulsed implementation, other means are required to improve the efficiency of a continuous wave amplifier system.

Therefore, there is a need for a continuous wave, non-linear optical amplifier which provides the needed degree of amplification to a continuous wave non-linear optical signal to enable detection of the amplified signal produced therefrom by a conventional optical detector.

SUMMARY OF THE INVENTION

The above and other objects are provided by a continuous wave, infrared optical parametric amplifier using an extremely high gain, non-linear optical crystal. The amplifier includes a beam combiner which receives a continuous wave, optical input signal. A pump beam having a higher frequency than the input signal is also applied to the beam combiner. The two signals are co-aligned in the beam combiner and output to an extremely high gain, non-linear optical element. In one preferred form this element comprises a periodically poled, lithium niobate (PPLN) non-linear crystal. The high gain, non-linear crystal receives the continuous wave, co-aligned output from the beam combiner and amplifies this signal by a predetermined amount. The degree of amplification is dependent on a number of parameters such as the intensity of the input signal beam and the physical size of the non-linear optical element. The non-linear optical element then produces an amplified, continuous wave non-linear optical signal which is fed into a beam separator. A beam separator separates the continuous wave, amplified input signal from the pump beam signal. The amplified, continuous wave input signal is then fed into an external optical detector.

The use of the extremely high gain, non-linear optical crystal allows the implementation of a continuous wave amplification system without the drawbacks of previous, pulsed non-linear optical amplifier systems. Thus, the amplifier system of the present invention, through its continuous wave implementation, prevents the loss of large amounts of data that can occur with a pulsed amplifier system.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a block diagram of a continuous wave, infrared optical parametric amplifier system in accordance with a preferred embodiment of the present invention, and further showing the output of the system being directed into an input of a conventional optical detector.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a continuous wave, infrared optical parametric amplifier system 10 in accordance with a preferred embodiment of the present invention. The amplifier system 10 is shown producing an output signal which is fed into a conventional optical detector 12. It will be appreciated immediately that the optical detector 12 is an independent component which does not form a part of the present invention.

The amplifier system 10 generally includes a beam combiner 14 for receiving a continuous wave input signal 16 at frequency $\omega_s$ and a pump beam 18 at frequency $\omega_p$. It will be appreciated that the pump beam is an optical signal having a shorter wavelength than the continuous wave input signal 16. The signals 16 and 18 are combined in the beam combiner 14 and co-aligned therein to produce a combined, continuous wave, non-linear optical signal 20. The beam combiner 14 may comprise a beam splitter, an optical grating, a bandpass filter, or any other suitable optical element for combining and co-aligning the input signal 16 and the pump beam 18.

The co-aligned, continuous wave signal 20 is then input into an extremely high beam optical element 22. In one preferred form, optical element 22 comprises a periodically poled, lithium niobate non-linear optical crystal. However, it will be appreciated that other extremely high gain crystals or optical elements could be incorporated, such as a periodically poled potassium trihydrogen phosphate (PPKTP) non-linear optical crystal. Once input into the optical element 22, the input signal 16 and the pump beam 18 undergo a process known as "parametric downconversion". A non-linear optical interaction occurs between the beams 16 and 18 by which optical energy from the pump beam 18 is transferred to the input signal 16. The result is that the strength of the input signal 16 increases dramatically by the time it reaches the output end of the non-linear optical element 22. Essentially, then, the combination of the non-linear optical element 22 and the pump beam 18 functions as an extremely high gain beam amplifier for the input signal 16.

The optical element 22 therefore generates a highly amplified, continuous wave, non-linear optical signal 24 which is then input to a beam separating element 26. The beam separating element 26 functions to separate out the pump beam component, designated by reference numeral 18a, from the highly amplified input signal, designated by reference numeral 16a. The highly amplified input signal 16a is then fed into the optical signal detector 12.

The gain provided by the non-linear optical element 22 is preferably on the order of between about 2–10 to achieve the needed degree of amplification. It will be appreciated that the physical size of the non-linear optical element 22 and the intensity of the pump beam 18 are two major factors that will affect the degree of amplification provided by the amplifier system 10. Other factors are the choice of nonlinear optical material, the cross sectional area of the input signal and pump beams, the temporal and spatial quality of the input signal and pump beams and the use of any optical beam confinement structures such as an optical waveguide or optical fiber.

The amplifier system 10 of the present invention, through the use of the extremely high beam optical element 22, allows a continuous wave pump beam to be used which prevents the loss of information in the non-linear input signal caused by traditional pulsed laser amplifiers.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An infrared, optical parametric amplifier, comprising:

a beam combiner for combining an input signal and a continuous wave pump beam to produce a composite signal;

a high gain non-linear optical element for receiving the composite signal and for amplifying the composite signal through a process of parametric down conversion to provide an amplified composite signal; and a beam splitter responsive to said non-linear optical element for extracting from said amplified composite signal a component corresponding to said input signal.

2. The amplifier of claim 1, wherein said non-linear optical element comprises a periodically poled, lithium niobate (PPLN) crystal.

3. The amplifier of claim 1, wherein said beam combiner comprises an optical grating.

4. The amplifier of claim 1, wherein said beam combiner comprises an optical bandpass filter.

5. An infrared, optical parametric amplifier, comprising:

a beam combiner for combining an input signal and a continuous wave pump beam to produce a composite signal;

a crystal for receiving the composite signal and for amplifying the composite signal to provide an amplified composite signal; and a beam splitter responsive to said crystal for extracting from said amplified composite signal a component corresponding to said input signal;

wherein said crystal includes a periodically poled, lithium niobate crystal that effects a parametric down conversion of the composite signal.

6. The amplifier of claim 5, wherein said beam combiner comprises an optical grating.

7. The amplifier of claim 5, wherein said beam combiner comprises an optical bandpass filter.

8. A method for amplifying an infrared signal, comprising:

a) providing said infrared input signal to a beam combiner;

b) providing a pump beam to said beam combiner;

c) using said beam combiner to optically co-align said infrared input signal and said pump beam signal to produce a composite optical signal;

d) inputting said composite optical signal into a high gain, non-linear crystal and using the crystal to effect parametric down conversion to thus amplify the composite signal to produce an amplified composite signal; and e) inputting the amplified composite signal into an optical device to separate a component corresponding to said infrared input signal therefrom.

9. The method of claim 8, wherein step a) comprises inputting said infrared input signal into an optical grating.

10. The method of claim 8, wherein step a) comprises inputting said infrared input signal into a bandpass filter.

* * * * *